United States Patent [19]

Ohmstedt

[11] Patent Number: 4,663,552
[45] Date of Patent: May 5, 1987

[54] GANGED INSIDE-OUT BRUSHHOLDER FOR DYNAMOELECTRIC MACHINE

[75] Inventor: Harry O. Ohmstedt, Saratoga Springs, N.Y.

[73] Assignee: General Electric Company, Schenectady, N.Y.

[21] Appl. No.: 834,074

[22] Filed: Feb. 26, 1986

[51] Int. Cl.$^4$ .............................................. H02K 9/28
[52] U.S. Cl. ..................................... 310/246; 310/239
[58] Field of Search ........ 310/239, 240, 242, 244–247, 310/251

[56] References Cited

U.S. PATENT DOCUMENTS

| | | | |
|---|---|---|---|
| 2,492,770 | 12/1949 | Stark | 310/247 |
| 3,387,155 | 6/1968 | Krulls | 310/239 |
| 4,329,611 | 5/1982 | Ohmstedt et al. | 310/227 |

FOREIGN PATENT DOCUMENTS

| | | | |
|---|---|---|---|
| 1106025 | 12/1955 | France | 310/247 |
| 1116280 | 5/1956 | France | 310/246 |

Primary Examiner—Patrick R. Salce
Assistant Examiner—D. L. Rebsch
Attorney, Agent, or Firm—Jerome C. Squillaro

[57] ABSTRACT

A removable ganged, inside-out brushholder for a dynamoelectric machine slidably supports brushes on pairs of cylindrical brush pins which engage mating pairs of holes in respective brushes. A septum between an adjacent pair of brushes supports the ends of a pair of constant-force springs on opposite sides thereof. The constant-force springs include coiled portions which engage the upper ends of the adjacent brushes between the pairs of cylindrical brush pins thus urging the brushes into contact with the surface of a collector ring. All surfaces of brushes in the vicinity of the collector ring are open for air cooling in this critical region. In addition, at least one full surface of each brush is fully exposed for air cooling and a predetermined amount of free space is provided between adjacent brushes and between each brush and a back plate for permitting substantial air flow thereover.

5 Claims, 6 Drawing Figures

Fig. 1
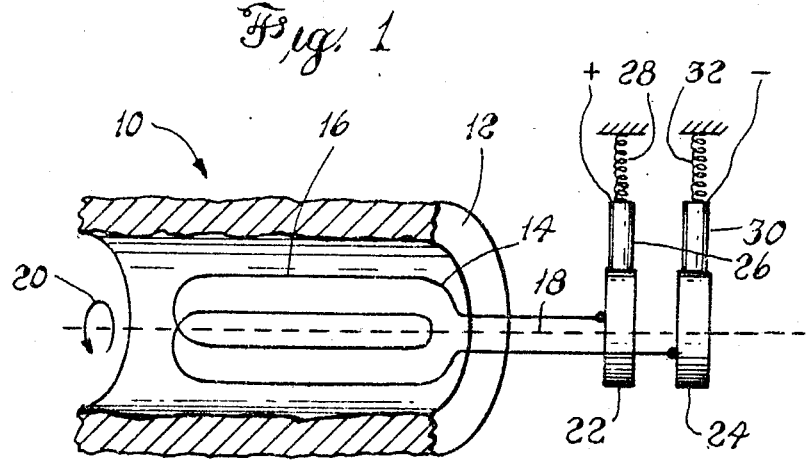
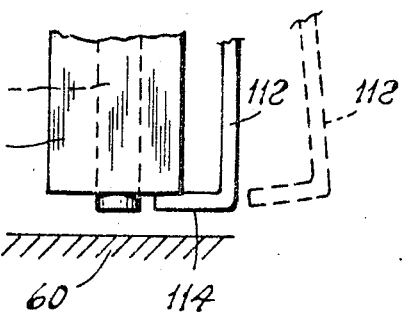
Fig. 6

GANGED INSIDE-OUT BRUSHHOLDER FOR DYNAMOELECTRIC MACHINE

BACKGROUND OF THE INVENTION

The present invention relates to electrically conductive brushes for dynamoelectric machines and, more particularly, to apparatus for holding brushes in a dynamoelectric machine for conducting electricity between stationary and rotary elements thereof.

Although the present invention may have general applicability to other large dynamoelectric machines, for concreteness of description, a large alternating current generator provides the exemplary environment.

A large alternating current generator employs a cylindrical rotor rotating within a stator for generating electric energy. Conventionally, the rotor is a field member and the stator is an armature. The rotor is excited by a source of direct current to produce two or more electro-magnetic poles which, when rotated within the armature, induce electric current and voltage in the armature coils. The induced current is delivered to an external load.

A substantial current is required to excite the rotor field. The excitation current is delivered to collector rings on the rotor from an external direct current generator through a plurality of carbon brushes. The brushes are held in stable contact with the collector rings by brush holders.

U.S. Pat. No. 3,864,803, and the U.S. patents referenced therein, disclose numerous devices for holding a carbon brush in contact with a collector ring. In particular, the '803 patent discloses a rectangular brush box into which a rectangular carbon brush is slidably inserted. A spring urges the brush toward the collector ring. A clamping arrangement bears against the side of the brush to hold the brush in its retracted position within the holding fixture while inserting it into a brush box. The clamping arrangement is released automatically as the holding fixture is installed in the brush box, thus permitting the spring to displace the brush into contact with the collector ring.

For maximum brush stability, it is desirable that the brush box extend as close to the collector ring as possible. In the prior art, the brush box extends to within about ⅛ inch of the collector ring.

As the power ratings of alternating current generators grow larger, the number of required brushes disposed about each collector ring can exceed 100. The individual brush holders of the above-referenced patent consume so much space in the vicinity of the collector rings, it is impossible to install enough brushes about the perimeter of the collector rings without lengthening the collector rings, or finding an improved method of packing more brushes in a smaller space. This problem is solved in U.S. Pat. No. 3,387,155 wherein several brush boxes are formed into a ganged brush holder for securing, for example, four, six or more brushes side by side. The clamping mechanism provides fingers for bearing on the sides of the brushes until released during installation in the machine.

The device of this latter patent extends the ganged brush boxes to about ⅛ inch from the collector ring. The temperature rise experienced by brushes is most extreme in the vicinity of the interface between the brushes and the collector ring. The brush boxes prevent free circulation of air in this critical neighborhood, thus limiting the current which ganged brushes can conduct.

In a ganged brush holder, it is difficult to produce a clamping mechanism capable of applying equal force to the sides of all brushes. Thus, a ganged brush holder may fail to retain one of more of the brushes in their retracted positions for installation in the machine. As a possible solution, a plate may be hinged under the working ends of all of the brushes to hold them in the retracted position. The plate is displaced out of contact with the brushes during installation, thereby releasing the brushes to move into contact with the collector ring. This solution requires that the ends of the brush boxes be spaced further away from the collector rings to leave space for the plate between the ends of the brush boxes and the collector ring. Thus, the ability of the brush boxes to provide stable support in the vicinity of the collector rings is reduced.

U.S. Pat. No. 4,329,611 discloses an inside-out brush holder for a single brush which omits the brush box and substitutes a pair of cylindrical brush pins fitting into cylindrical holes in the brush. A constant-force spring urges the brush along the pins toward the collector ring. A clamping mechanism functions in a manner analogous to that in the box-type holder. Since the box is omitted, substantially free air flow about the exterior of the brush is effective to cool the brush, particularly in the critical region in the vicinity of the interface with the collector ring. This patent also suggests, without disclosure of a structure to accomplish it, that the inside-out brush holder may be applied to the ganged brush holder of the U.S. Pat. No. 3,387,155.

The need has now arisen for specific apparatus for a ganged, inside-out brushholder.

OBJECTS AND SUMMARY OF THE INVENTION

Accordingly, it is an object of the invention to provide a ganged, inside-out brushholder for holding brushes in a dynamoelectric machine.

It is a further object of the invention to provide a ganged, inside-out brushholder for a dynamoelectric machine in which at least one septum between adjacent brushes provides attachment points for constant-force springs which urge the brushes into contact with a collector ring. Coiled portions of the constant-force springs are disposed between a pair of cylindrical brush pins in each brush.

Briefly stated, the present invention provides a removable ganged, inside-out brushholder for a dynamoelectric machine which slidably supports brushes on pairs of cylindrical brush pins engaging mating pairs of holes in respective brushes. A septum between an adjacent pair of brushes supports the ends of a pair of constant-force springs on opposite sides thereof. The constant-force springs include coiled portions which engage the upper ends of the adjacent brushes between the pairs of cylindrical brush pins, thus urging the brushes into contact with the surface of a collector ring. In addition, at least one full surface of each brush is exposed for air cooling. All surfaces of brushes in the vicinity of the collector ring are open for air cooling in this critical region.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified schematic diagram of an alternating current generator providing the environment in which the present invention is described.

FIG. 6 is a view along VI—VI1 in FIG. 4.

DETAILED DESCRIPTION OF THE PREFERRED EMBODIMENT

Figure 2:
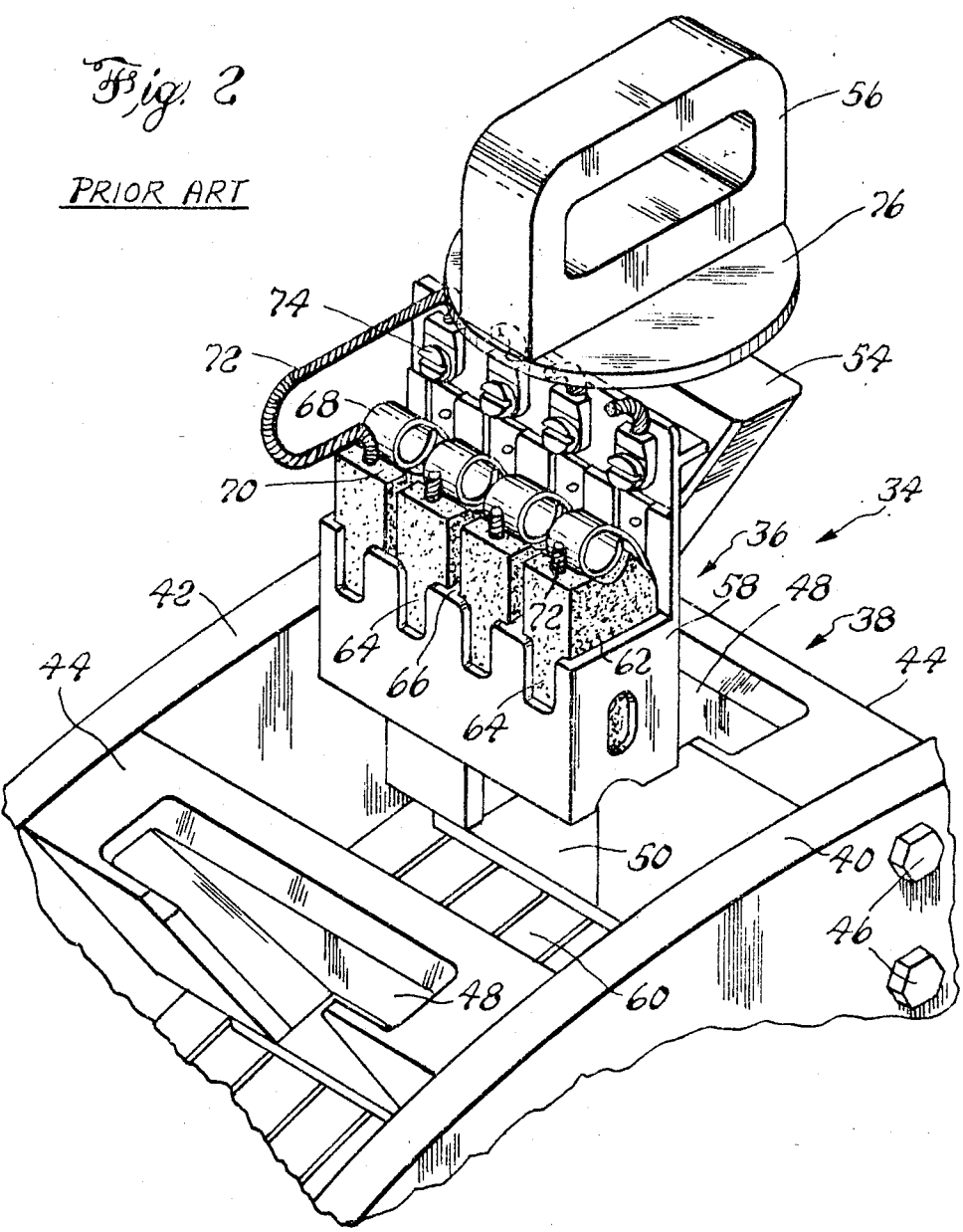
FIG. 2 is a perspective view of a removable brush magazine arrangement according to the prior art.

Referring to FIG. 1, there is shown, generally at 10, a simplified schematic diagram of an alternating current generator. An annular stator 12, having armature coils (not shown) embedded in an inner surface thereof, surrounds a rotor 14, represented by a field winding 16. Rotor 14 is rotatable about an axis 18 by a prime mover (not shown), as indicated by an arrow 20.

Rotor 14 is excited by direct current fed thereto through collector rings 22 and 24 which rotate concentrically with rotor 14. A stationary carbon brush 26 is urged into contact with collector ring 22 by a spring 28. A positive side of a direct current supply is fed through carbon brush 26 and collector ring 22 to one end of field winding 16. Similarly, a carbon brush 30 is urged into contact with collector ring 24 by a spring 32 for supplying a negative side of the direct current supply to the other end of field winding 16.

A large alternating current generator may require several thousand amperes for exciting its field winding 16. This large-current exceeds the current-carrying capability of a single carbon brush at each end of field winding 16. Thus, many carbon brushes 26 and 30 are operated in parallel to provide sufficient current to field winding 16.

Referring now to FIG. 2, a removable brush magazine arrangement 34 of a type disclosed in referenced patent U.S. Pat. No. 3,387,155 is shown. A simplified description of the prior patent is included herein to provide a basis for understanding the present invention. For additional details of the prior-art device, one is referred to the referenced patent whose teachings are herein incorporated by reference.

Removable brush magazine arrangement 34 includes a plurality of removable brush magazines 36 adapted for installation into a stationary structure 38. Stationary structure 38 includes first and second annular rings 40 and 42 between which a plurality of metal crossbars 44 are rigidly affixed using, for example, bolts 46. Each metal crossbar 44 includes a wedge-shaped slot 48 and a bottom plate 50.

Removable brush magazine 36 includes a wedge-shaped block 54 fittable into wedge-shaped slot 48 and lockable therein by rotation of a locking handle 56 in the manner described in the referenced patent. A rectangular metal brush box 58 is rigidly affixed to wedge-shaped block 54 so that, when wedge-shaped block 54 is locked into wedge-shaped slot 48, rectangular metal brush box 58 is similarly rigidly locked into a predetermined position with respect to a collector ring 60.

Rectangular metal brush box 58 includes a plurality of brush chambers 62, each of which contains a carbon brush 64 slidably disposed therein. Each adjacent pair of brush chambers 62 is separated by a divider 66. A constant-force coil spring 68 bears against an upper end 70 of each carbon brush 64 for urging it downward in its brush chamber 62 for contact with collector ring 60.

Each carbon brush 64 includes a flexible brush lead 72 having a first end mechanically and electrically connected thereto. Only on flexible brush lead 72 is shown completely, the remaining flexible brush leads 72 are broken away for clarity of illustration. A second end of each flexible brush lead 72 is connected to rectangular metal brush box 58 using, for example, a screw 74. An insulating plate 76 attached to locking handle 56 covers the metallic components for protecting a worker from electrical shock.

Figure 3:
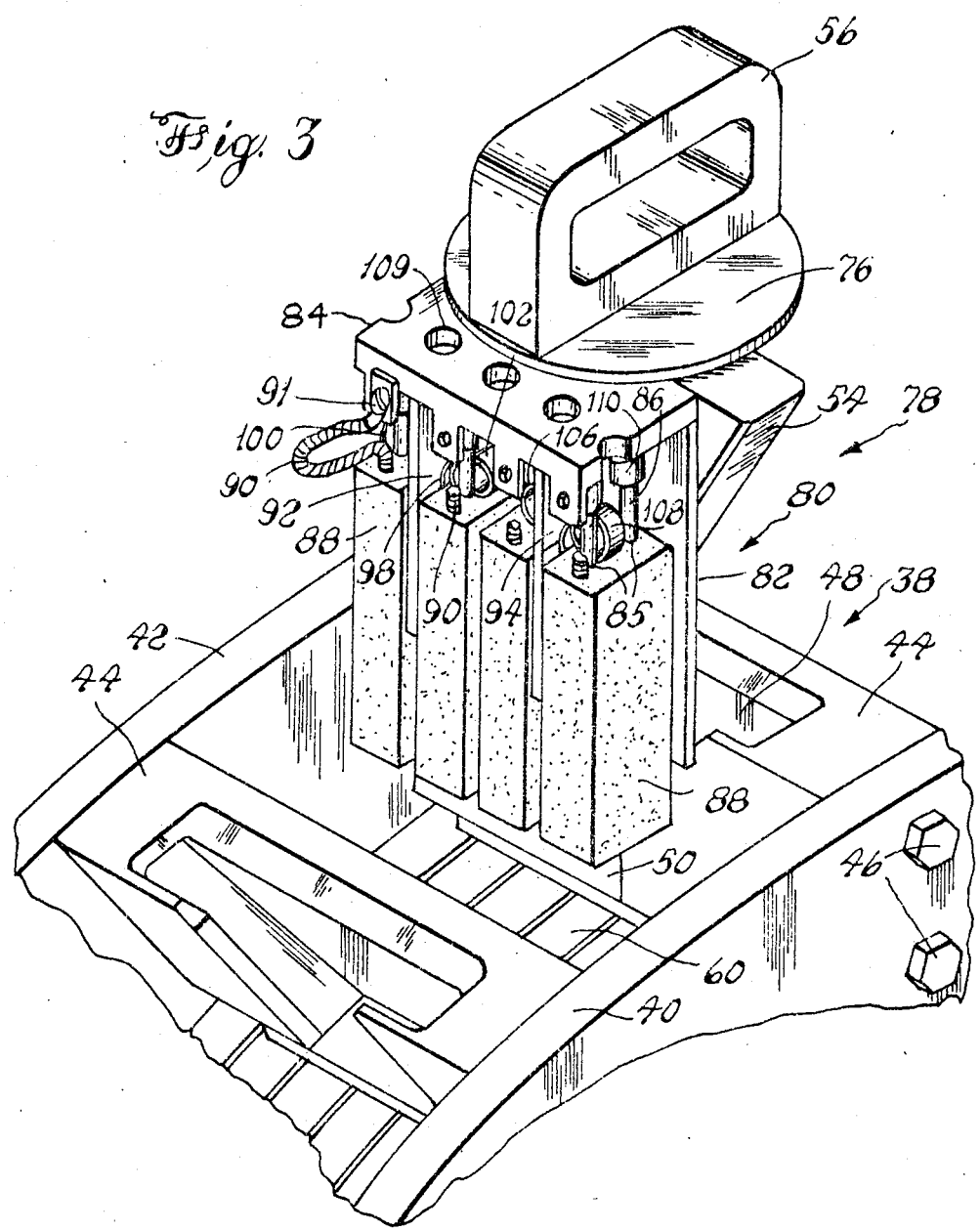
FIG. 3 is a perspective view of a removable brush magazine arrangement according to an embodiment of the invention.

Referring now to FIG. 3, there is shown, generally at 78, a removable brush magazine arrangement according to an embodiment of the invention. Removable brush magazine arrangement 78 includes a removable brush magazine 80 lockable therein by rotation of a locking handle 56. Locking handle 56 may include means (not shown) for permitting its removal once the assembly is locked in place. This locking arrangement may be identical to that of the prior-art device of FIG. 2. Thus, removable brush magazine arrangement 78 may be substituted for removable brush magazine 36 without additional redesign of stationary structure 38 (FIG. 2).

Removable brush magazine 80 includes a back plate 82 affixed to wedge-shaped block 54 and a top plate 84 at right angles thereto. An insulating plate 76 prevents accidental contact with electrical components during insertion and removal of removable brush magazine 80. Four pairs of parallel cylindrical brush pins 86 extend downward from top plate 84 engaging cylindrical bores 85 in brushes 88. Each brush 88 is electrically connected to one end of a flexible brush lead 90. The other end of each flexible brush lead 90 is affixed to top plate 84 using, for example, a screw 91.

Figure 4:
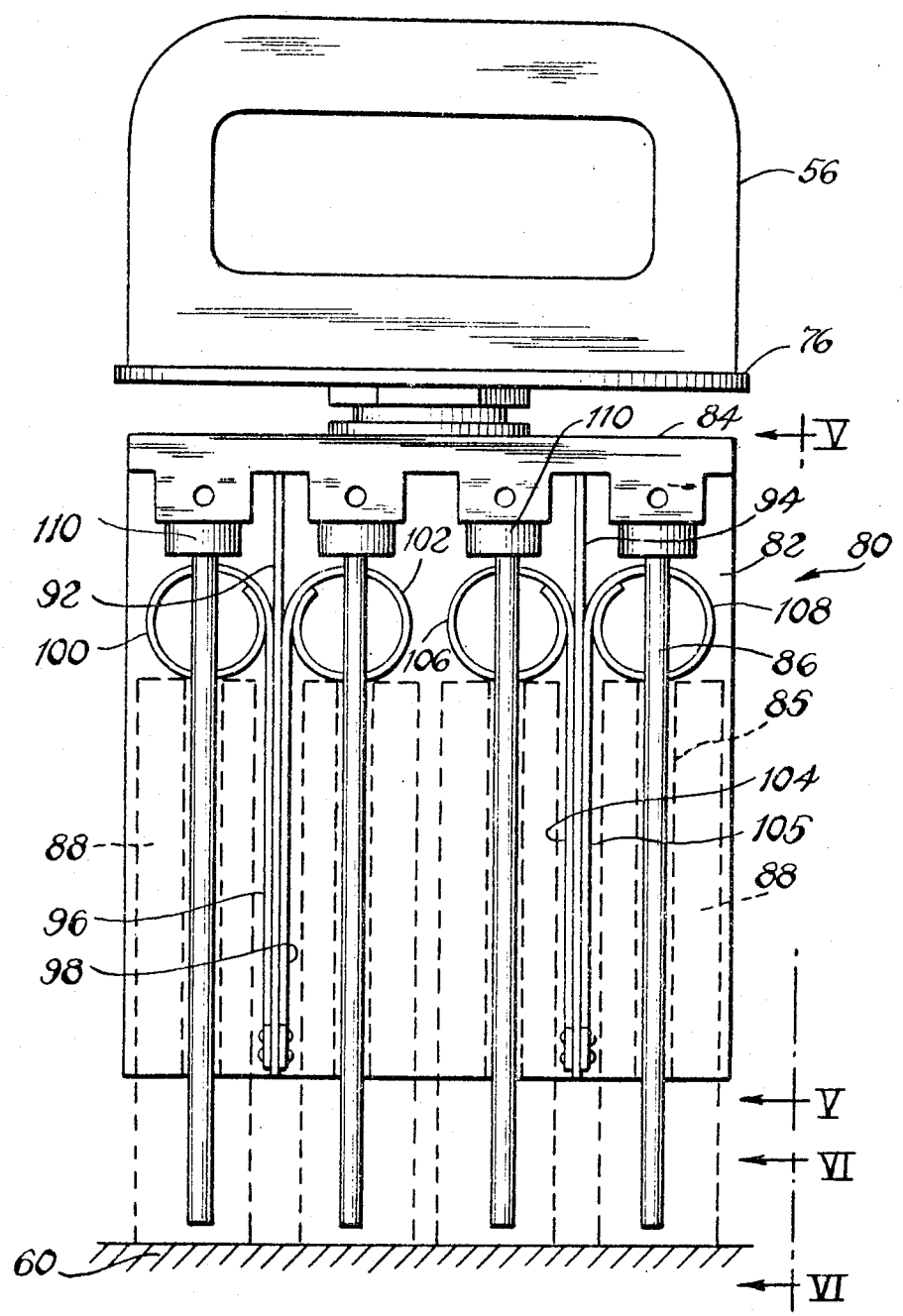
FIG. 4 is a front view of the removable brush magazine arrangement of FIG. 3 from which elements unessential to the description are omitted.
Figure 5:
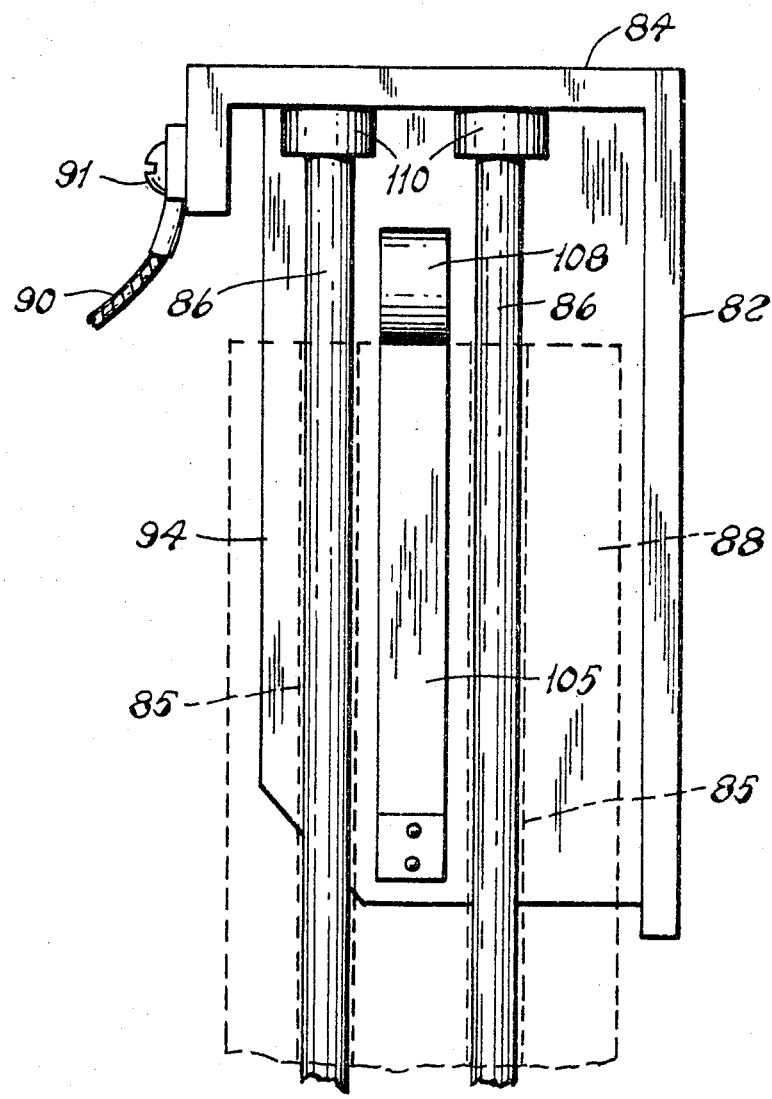
FIG. 5 is a view along V—V1 in FIG. 4.

Referring now also to FIGS. 4 and 5, a first septum 92 is disposed between the first and second brushes 88 from a first end of removable brush magazine 80. First and second constant-force springs 96 and 98 are affixed to opposite sides of the bottom of septum 92. Coiled portions 100 and 102 of constant-force springs 96 and 98, respectively, curl outward in opposite directions from septum 92 where they lie between their pair of cylindrical brush pins 86 and bear downward on their brushes 88. Similarly, a second septum 94 is disposed between first and second brushes 88 from a second end of 80. Third and fourth constant-force springs 104 and 105 are affixed to opposite sides of the bottom of septum 94 and coiled portions 106 and 108 thereof curl outward in opposite directions from the septum 94 where they lie between their pair of cylindrical brush pins 86 and bear downward on their brushes 88. It will be noted that each brush pin 86 is supported in an enlarged boss 110 integrally formed with top plate 84. A plurality of inspection holes 109 through top plate 84 permit inspection of the length of brushes 88 without removing removable brush magazine 80 from stationary structure 38.

Each cylindrical brush pin 86 is permitted to extend as close as possible to collector ring 60 in order to provide stable support to its brush 88. It will be noted that, since the support provided by cylindrical brush pins 86 is internal within brush 88, and does not rely on back plate 82, back plate 82 is not required to extend close to collector ring 60. Thus, substantially all of each brush 88 in the vicinity of collector ring 60 is open to air circulation produced, for example, by a fan (not shown) and therefore is strongly cooled by turbulent air flow typical in this region. The length of back plate 82 need only be sufficient to support septa 92 and 94 far enough down from the top to provide adequate vertical distance for coiled portions 100, 102, 106 and 108 to feed their respective brushes 88 toward collector ring 60.

In the preferred embodiment, brushes 88 are about four inches long and the bottom edge of back plate 82 is spaced about 1.5 inches from collector ring 60. Thus, the entire perimeter of the first 1.5 inches of each brush 88 from collector ring 60 is fully open for air cooling in both axial and circumferential directions. Since the strongest heating of a brush 88 takes place at, or within about one-quarter inch of its interface with collector ring 60, permitting air cooling of this critical end region is particularly effective in controlling the temperature rise of brushes 88. In addition to the extremities of brushes 88, one full side of the center two brushes 88 and two full sides of the end two brushes 88 are fully open to air cooling. Each brush 88 is spaced from its neighbor and from back plate 82 by a predetermined distance such as, for example, at least one-eight inch.

Referring now to FIG. 6, a brush retainer 112 includes a bent end 114 which is disposed under the end of brush 88 in the brush-holding position as shown in solid line. Brush retainer 112 is pivoted into the released position, shown in dashed line, in any convenient manner such as, for example, by a cam action of a type disclosed in the referenced patents. In the released position, bent end 114 is moved out of contact with brush 88 thus permitting brush 88 to be displaced into contact with the surface of collector ring 60.

It will be noted that the embodiment of the invention shown in FIG. 6 permits cylindrical brush pin 86 to extend toward collector ring 60 as far as desired to achieve stable support of brush 88 without concern for the thickness of bent end 114. That is, at the maximum retraction of brush 88, the tip of cylindrical brush pin 86 may protrude from brush 88. Thus, the end of cylindrical brush pin 86 may extend to within about one-eighth inch of collector ring 60. The extra retraction of brush 88 permits the thickness of bent end 114 to be interposed between the end of brush 88 and collector ring 60 without requiring the support member (cylindrical brush pin 86) to be displaced more than desired. This is in contrast to the box structure of the prior art which must be cut back enough to permit the thickness of bent end 114 to be inserted between it and collector ring 60, thereby reducing the support for brush 88. Brush retainer 112 includes large openings (not shown) therein to permit free air flow therethrough in the circumferential direction.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ganged, inside-out brushholder for a dynamoelectric machine comprising:
    a removable brush magazine;
    first and second parallel cylindrical brush pins affixed to said removable brush magazine;
    said first and second parallel cylindrical brush pins being slidably engageable in first and second cylindrical bores, respectively, in a first brush;
    third and fourth parallel cylindrical brush pins affixed to said removable brush magazine;
    said third and fourth parallel cylindrical brush pins being slidably engageable in third and fourth cylindrical bores in a second brush;
    a septum affixed to said removable brush magazine and disposed between said first and second brushes;
    first and second constant-force springs affixed to opposite sides of said septum;
    said first and second constant-force springs including first and second coiled portions, respectively;
    said first coiled portion extending in a first direction from said septum toward said first brush and passing at least partly between said first and second cylindrical brush pins and bearing resiliently upon an end of said first brush; and
    said second coiled portion extending in a second opposite direction from said septum toward said second brush and passing at least partly between said third and fourth cylindrical brush pins and bearing resiliently upon an end of said second brush.

2. A ganged, inside-out brushholder according to claim 1 wherein said removable brush magazine includes a top plate and a back plate, and said septum is affixed to said top plate and said back plate.

3. A ganged, inside-out brushholder according to claim 2 wherein said top plate includes at least, first, second, third and fourth bosses, said first, second third and fourth cylindrical brush pins being affixed in said first, second, third and fourth bosses.

4. A ganged, inside-out brushholder according to claim 2 wherein said top plate and said back plate terminate a substantial distance short of an end of said cylindrical brush pins, whereby a substantial portion of said brushes may be cooled.

5. A ganged, inside-out brushholder according to claim 2 wherein said brushes have an operating position and a retracted position, and said removable brush magazine includes means for holding said brushes in said retracted position with ends of said cylindrical brush pins protruding a predetermined distance beyond an end of said brushes.

* * * * *